May 20, 1969   J. B. DAVIDSON   3,444,971
CLUTCH WITH NON-ROTATABLE FLUID MOTOR
Filed April 24, 1967
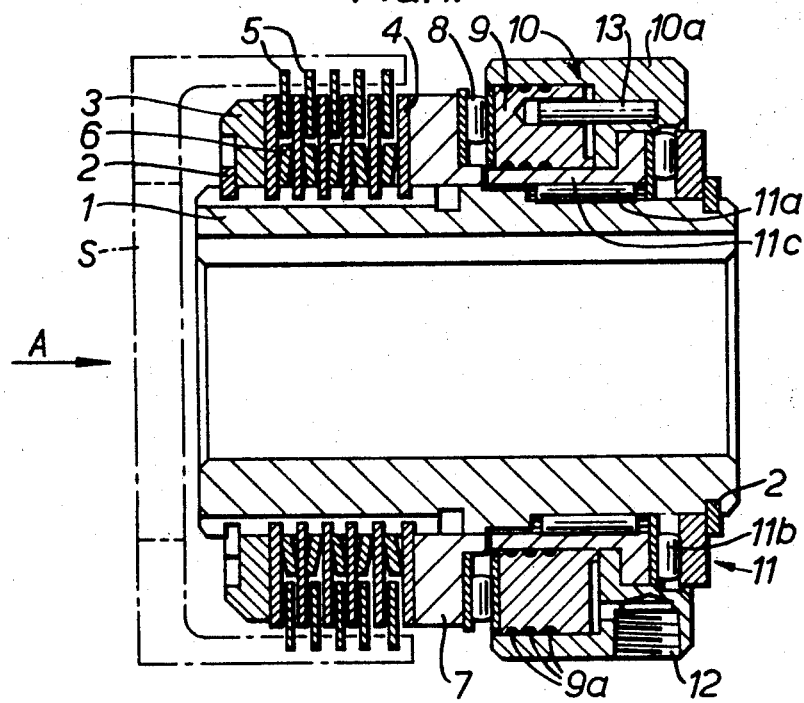
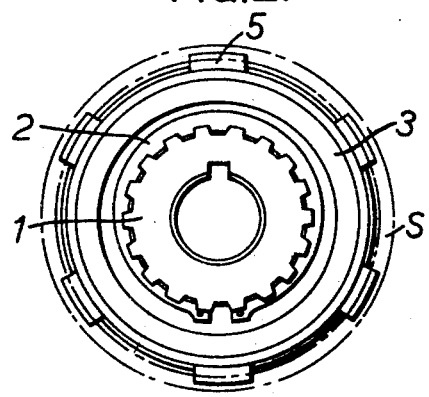
Inventor:-
John Bruce Davidson
by: Watson, Cole, Grindle + Watson
Attorneys United States Patent Office 3,444,971
Patented May 20, 1969

3,444,971
CLUTCH WITH NON-ROTATABLE FLUID MOTOR
John Bruce Davidson, Brechin, Angus, Scotland, assignor to Coventry Gauge & Tool Company Limited, Warwickshire, England, a British company
Filed Apr. 24, 1967, Ser. No. 633,272
Claims priority, application Great Britain, Apr. 29, 1966, 18,840/66
Int. Cl. F16d 25/00, 19/00
U.S. Cl. 192—85   1 Claim

ABSTRACT OF THE DISCLOSURE

A multi-disc clutch is provided with operating mechanism comprising a fluid pressure actuated annular piston and cylinder. The inner wall of the cylinder directly provides a race for bearing means supporting the piston and cylinder about the hub of the clutch, whereby a compact form of the operating mechanism and clutch is made possible.

This invention relates to clutches of the multi-disc type in which a friction disc assembly or pack is provided about a hub for effecting a drive between the latter and a further rotary member and in which the disc pack is arranged for axial pressure operation by the piston of a fluid pressure actuated annular piston and cylinder disposed about the clutch hub, the cylinder being mounted by bearing means on the hub for relative rotation of the latter.

The object of this invention is to provide an improved arrangement of fluid actuated operating mechanism in a clutch of the above mentioned type whereby manufacture is facilitated and a compact construction made possible.

In the accompanying drawings:
FIGURE 1 is an axial plane section of a multi-disc type clutch embodying operating means according to this invention, and
FIGURE 2 is an end view on a reduced scale and in the direction of the arrow A of FIGURE 1.

Referring to the drawings the clutch consists of a hollow hub 1 for mounting on a shaft and carrying the friction disc assembly or pack 4, 5 between an axially fixed back up ring or plate 3 and an axially movable pressure plate or washer 7, counter discs 4 of the disc assembly being axially slidable but rotationally fast relative to the hub i.e. by splined engagement with the latter whilst also in the usual manner, alternate discs 5 are arranged for dogged engagement with a spider indicated at S of a driven member such as a gear (not shown).

The friction disc assembly 4, 5 or pressure plate 7 acting thereon is arranged to be operated by fluid pressure actuated piston and cylinder means consisting of an annular piston 9 received by an annular cylinder 10 and acting on the pressure plate 7 through an anti-friction thrust bearing 8.

The piston 9 and cylinder 10 are carried by bearing means 11 on the hub 1 so that in use the cylinder 10 can be held stationary in relation to rotation of the hub 1, friction disc assembly 4, 5 and pressure plate 7, the bearing means 11 being shown as a combined radial and thrust bearing of which the radial portion 11a is shown of needle form whilst the thrust portion 11b also consists of a needle bearing but may be a ball bearing.

The cylinder 10 is shown conveniently constructed by means of a recessed ring 10a mounted about a loose flanged inner co-axial ring or race 11c of the bearing 11 so that the race 11c thus provides the inner wall of the annular cylinder 10 as well as serving as a combined radial and thrust bearing race.

For closing the discs 4, 5 together in transmitting a drive, fluid under pressure such as hydraulic fluid or air is admitted to the cylinder 10 through the port 12 which causes the piston 9 to act on the pressure plate 7 through the thrust bearing 8.

When disengagement of the clutch is required fluid pressure is released by venting the cylinder 10 at the port 12 and in order to ensure disengagement of the clutch discs 4, 5 resilient means in the form of spring disc 6 are interposed between the counter discs 4 for effecting their separation from the discs 5 and also return movement of the piston 9 with consequent expulsion of fluid from the cylinder 10 through the port 12.

The piston 9 is preferably provided with a labyrinth-type seal at 9a affording a metered bleed of the actuating fluid and so minimising air locks and the possibility of seizure due to fluid contamination. The piston 9 is also shown pegged at 13 to the cylinder ring 10a to prevent their relative rotation but, of course, permitting necessary axial movement of the piston 9.

The complete clutch assembly and operating mechanism is shown retained in position on the hub 1 by circlips 2, 2. Although the clutch and operating mechanism may be of compact form to facilitate installation, considerable and variable pressure can be applied to the friction disc assembly 4, 5 for controlled high torque power transmission. Moreover remote control of the clutch can be readily effected whilst the arrangement of fluid operation is self-adjusting to wear of the friction discs 4, 5.

I claim:
1. A clutch of the multi-disc type comprising a hub, an annular disc pack surrounding said hub for effecting a drive between said hub and a further rotary member, operating mechanism for applying axial pressure to said disc pack to engage said clutch, said operating mechanism comprising an annular cylinder surrounding said hub and a fluid pressure actuated annular piston within said cylinder, needle-bearing means mounting said cylinder on said hub for rotation relative thereto, said cylinder comprising an outer recessed annular ring and a co-axial inner, radially flanged ring on which said outer ring is mounted, said piston being received between and fully supported by said rings, said inner ring constituting at its outer face the inner wall of the cylinder and providing directly by its inner face a race for said needle-bearing means, a radial flange on said hub, and axial thrust bearing means disposed between said hub flange and said radial flange on said inner ring, the latter serving directly as the race for said thrust bearing means.

References Cited

UNITED STATES PATENTS 2,682,892   6/1954   Picard.
3,038,575   6/1962   Hansen.
3,065,832   11/1962   Becknell.

BENJAMIN W. WYCHE III, *Primary Examiner.*